United States Patent
Numano et al.

(10) Patent No.: US 7,113,455 B2
(45) Date of Patent: Sep. 26, 2006

(54) PORTABLE INFORMATION EQUIPMENT

(75) Inventors: Fujihito Numano, Hamura (JP); Akinori Tokunaga, Kokubunji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1025 days.

(21) Appl. No.: 10/044,946

(22) Filed: Jan. 15, 2002

(65) Prior Publication Data

US 2002/0093885 A1 Jul. 18, 2002

(30) Foreign Application Priority Data

Jan. 16, 2001 (JP) ............................. 2001-007994

(51) Int. Cl.
  *G11B 21/08* (2006.01)
  *G06F 13/00* (2006.01)
(52) U.S. Cl. ............................. 369/30.08; 369/30.36; 710/14
(58) Field of Classification Search ............. 369/30.36, 369/30.08, 30.05; 710/14, 8–9, 15, 36, 38, 710/1, 17, 19; 713/300, 320, 324
See application file for complete search history.

(56) References Cited

U.S. PATENT DOCUMENTS

| | | | | |
|---|---|---|---|---|
| 6,226,237 | B1* | 5/2001 | Chan et al. | 710/14 |
| 6,542,445 | B1* | 4/2003 | Ijichi et al. | 369/30.08 |
| 6,763,400 | B1* | 7/2004 | Numano et al. | 710/14 |
| 6,895,448 | B1* | 5/2005 | Chan et al. | 710/14 |
| 6,954,805 | B1* | 10/2005 | Numano et al. | 710/14 |

FOREIGN PATENT DOCUMENTS

| | | |
|---|---|---|
| JP | 11-282500 | 10/1999 |
| JP | 2000-194492 | 7/2000 |
| JP | 2000-227832 | 8/2000 |

OTHER PUBLICATIONS

Winamp.com, "Winamp Player Overview", Apr. 28, 1999, pp. 1-3, http://web.archive.org/web/19990428181707/winamp.com/winamp/overview.html.*
Winamp.com, "Winaamp Player New Features". Apr. 22, 1999, pp. 1-4□□ http://web.archive.org/web/19990422173945/winamp.com/winamp/newfeatures.html.*

* cited by examiner

*Primary Examiner*—Ali Neyzari
(74) *Attorney, Agent, or Firm*—Oblon, Spivak, McClelland, Maier & Neustadt, P.C.

(57) ABSTRACT

A portable information equipment of this invention has a jog switch for generating different events in correspondence with flip directions and times, and means for executing a process corresponding to a type of event generated by the jog switch.

10 Claims, 9 Drawing Sheets

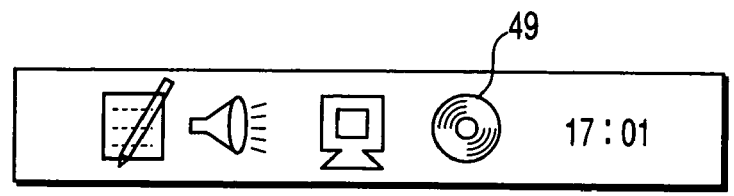
F I G. 14
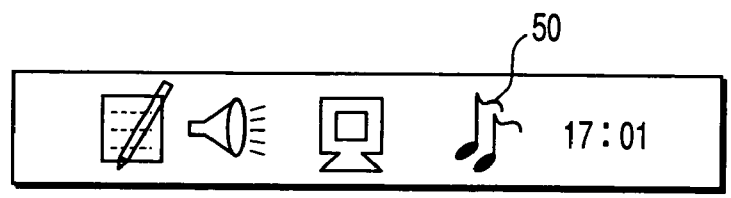
F I G. 15
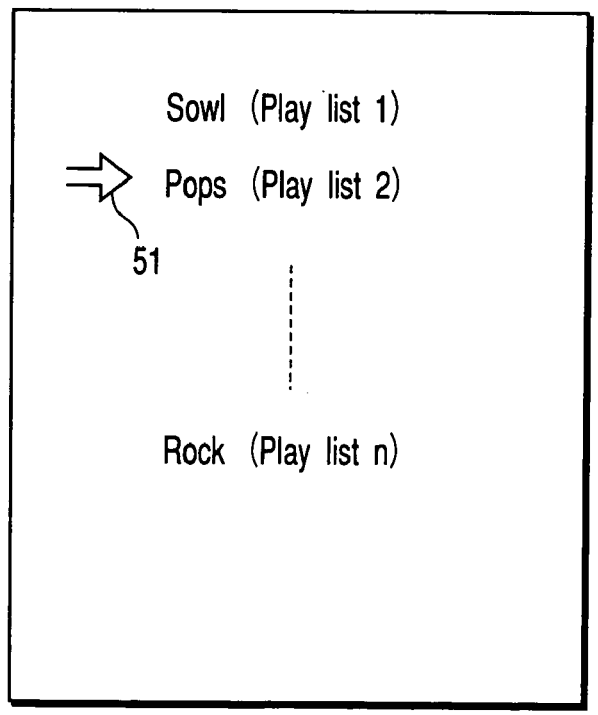
F I G. 16

PORTABLE INFORMATION EQUIPMENT

CROSS-REFERENCE TO RELATED APPLICATIONS

This application is based upon and claims the benefit of priority from the prior Japanese Patent Application No. 2001-007994, filed Jan. 16, 2001, the entire contents of which are incorporated herein by reference.

BACKGROUND OF THE INVENTION

1. Field of the Invention

The present invention relates to a portable information equipment and, more particularly, to a personal computer for reproducing CD/DVD data recorded on CD/DVD media and MP3 data recorded on a memory card and HDD etc.

2. Description of the Related Art

Upon reproducing digital audio/video data stored in a computer, switching data to be reproduced, and fastforwarding/rewinding data, a method of making an instruction using a mouse or inputting via a keyboard is used.

However, a portable notebook type computer does not always have high operability, since such conventional input interface requires delicate operations. For this reason, some personal computers simplify operations by making a choice from those displayed on a menu using a jog dial.

However, since the jog dial generates an event by dial operation, it can generate only two different events, i.e., an event indicating dialing in one direction, and an event indicating dialing in the other direction. Hence, if there are many choices, jog dial operations are complicated.

More specifically, if there are 20 choices, when the user wants to select the 20th choice while the cursor used to select an item is located at the first choice, he or she must turn the jog dial 20 times to move the cursor, resulting in troublesome operations.

BRIEF SUMMARY OF THE INVENTION

The present invention has been made in consideration of the above situation, and has as its object to provide a portable information equipment which can easily select a plurality of processes by operating a jog switch.

Therefore, in order to achieve the above object, the first invention of the present invention is a computer system comprising: a switch for generating different events in correspondence with flip direction and flip times; and means for executing a process corresponding to a type of event generated by the switch.

According to this computer system, since different processes are executed in correspondence with the types of events generated by the jog switch, a plurality of processes can be selected by simple operations using the switch.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 14 shows a tray icon in a CD/DVD mode;

FIG. 15 shows a tray icon in a digital audio mode;

FIG. 16 shows a display example upon switching a play list;

DETAILED DESCRIPTION OF THE INVENTION

A notebook type personal computer according to an embodiment of the present invention will be described below with reference to the accompanying drawings. In this embodiment, data to be reproduced is limited to sound (audio) data, and a description of digital video data will be omitted.

The basic structure of the notebook type personal computer according to the embodiment of the present invention will be described first with reference to FIGS. 1 and 2.

Figure 1:
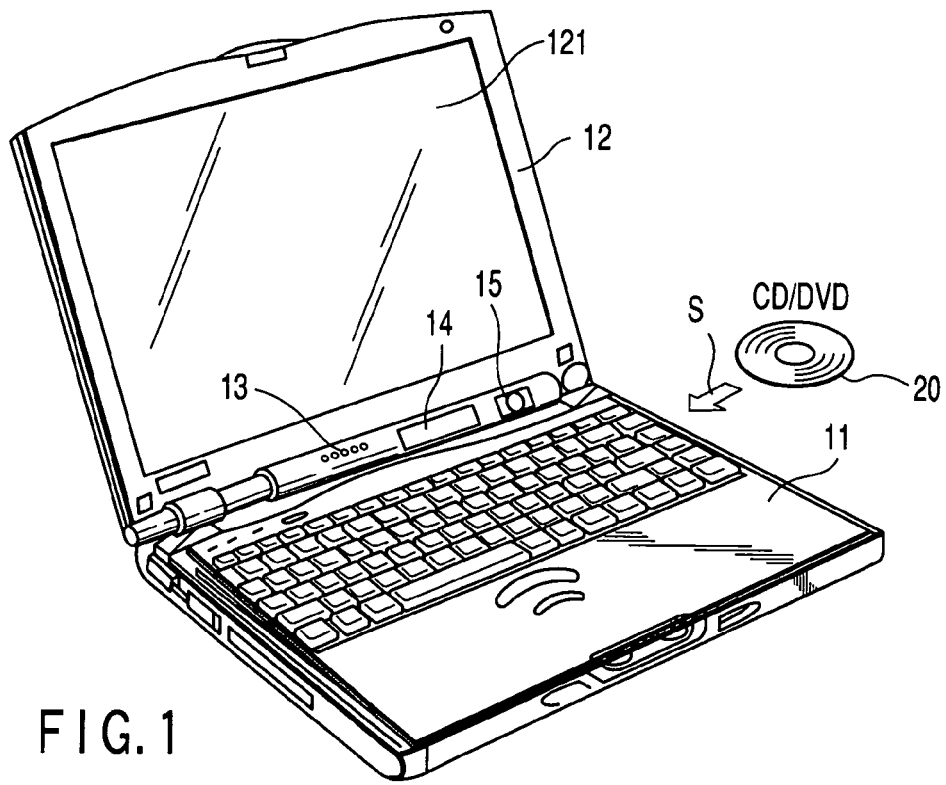
FIG. 1 is a front view of a computer with its display unit being opened.
Figure 2:
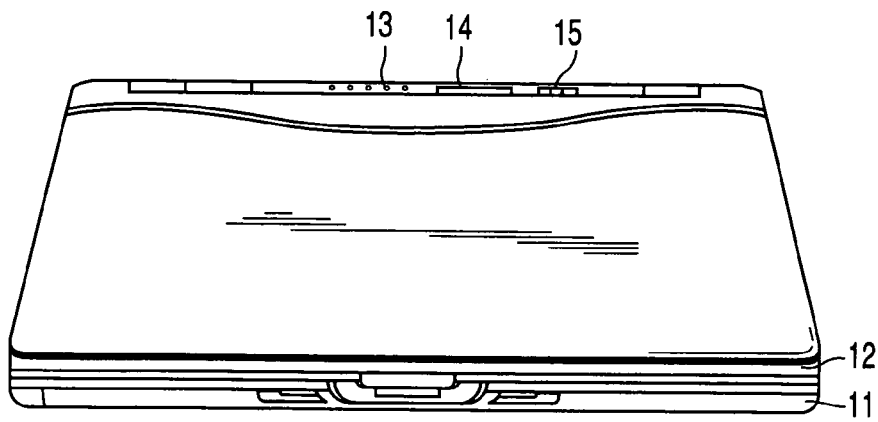
FIG. 2 is a front view of the computer with its display unit being closed.
Figure 3:
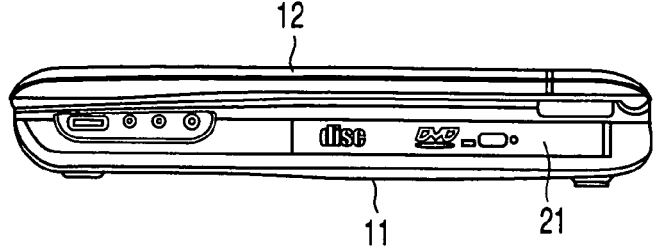
FIG. 3 is a side view from the direction of an arrow (S) in FIG. 1 with the display unit being closed.

FIG. 1 is a front view of the computer with its display unit being opened, FIG. 2 is a front view of the computer with its display unit being closed, and FIG. 3 is a side view from the direction of an arrow (S) in FIG. 1 with the display unit being closed.

This computer comprises a computer main body 11 and display unit (panel) 12.

The display unit 12 has a built-in display screen 12 comprising an LCD. The display unit 12 is attached to the computer main body 11 to be pivotal between the open and close positions.

The computer main body 11 has a low-profile box-shaped housing, and a keyboard, pointing stick, and the like are arranged on its upper surface.

A system indicator 13, operation buttons 14, and jog switch 15 are provided to the upper surface of the computer main body 11. The system indicator 13, operation buttons 14, and jog switch 15 are externally exposed even when the display panel 12 is closed, as shown in FIG. 2. In this embodiment, a notch is formed between the right and left hinges of the lower portion of the display panel 12, so that a back (rear) side region of the upper surface of the computer main body is externally exposed even when the display panel 12 is closed.

The system indicator 13 includes a plurality of LED lamps, which indicate various kinds of status such as ON/OFF of a power supply, access to an HDD, connection/disconnection of an AC adapter, and the like by their ON/OFF states.

Figure 4:
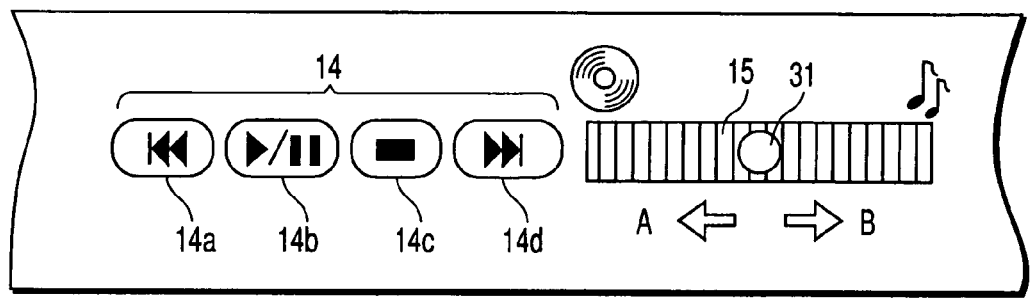
FIG. 4 is a top view of operation buttons 14 and jog switch 15.
Figure 5:
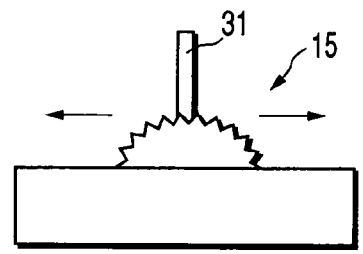
FIG. 5 is a side view of the jog switch 15.

FIG. 4 is a top view of the operation buttons 14 and jog switch 15, and FIG. 5 is a side view of the jog switch 15. As shown in FIGS. 4 and 5, the jog switch 15 has a knob 31, which can be flipped to the right or left. When the user flips the knob 31 of the jog switch 15 to the right or left and then releases it, the knob 31 automatically returns to a neutral (central) state.

The operation buttons 14 are used to operate an object to be operated, which is switched by a program. For example, the object to be operated may be a CD/DVD medium or a digital audio medium.

As shown in FIG. 4, the operation buttons 14 include a rewind button 14a, play/pause button 14b, stop button 14c, and fastforward button 14d.

The rewind button 14a is used to rewind a tune to reproduce to the immediately preceding tune. The play/pause button 14b is used to reproduce a tune, and to pause reproduce of a tune if it is pressed during reproduce. The stop button 14c is used to stop reproduce of a tune when it is pressed during reproduce. The fastforward button 14d is used to fastforward a tune to be reproduce to the next tune.

Figure 6:
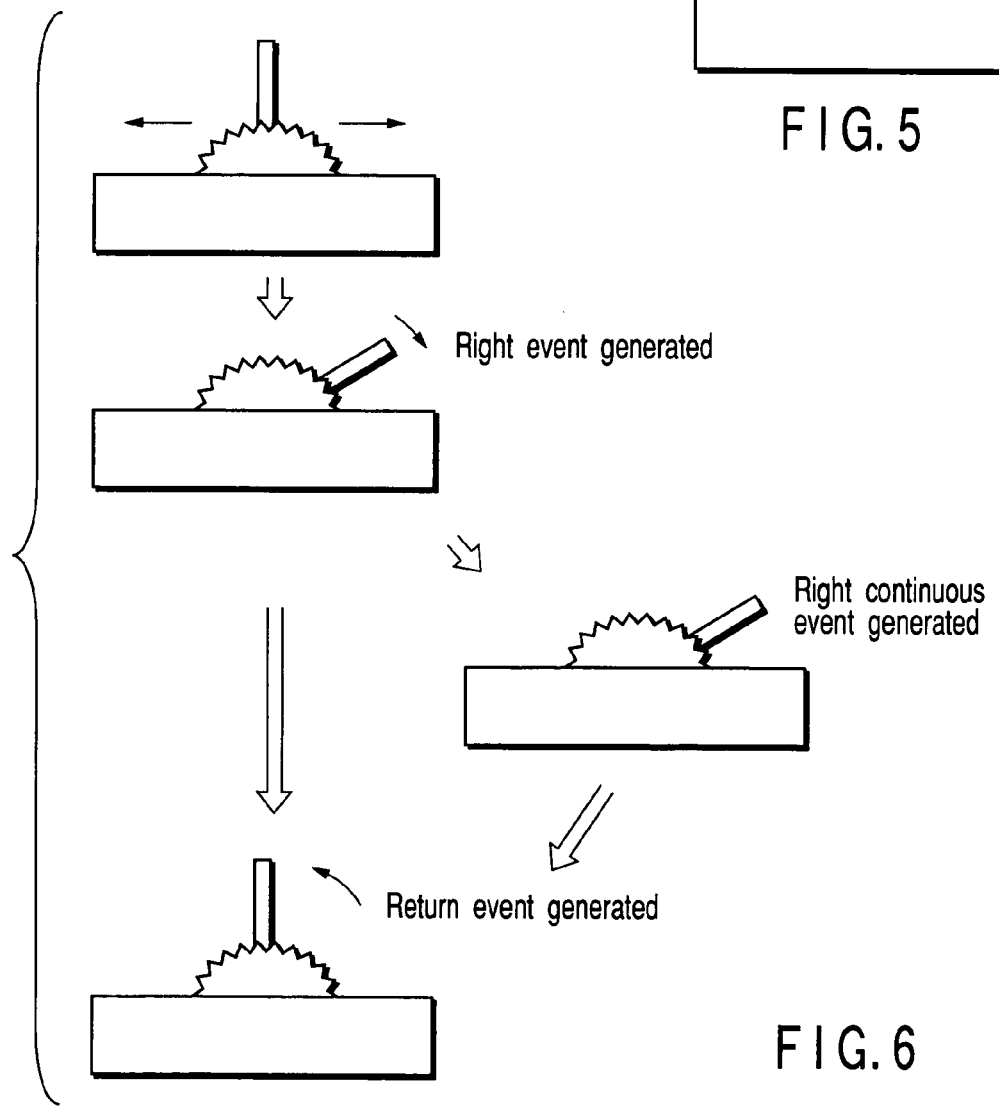
FIG. 6 is a view for explaining the relationship between the operations of the jog switch 15 and events.

FIG. 6 is a view for explaining the relationship between the operations of the jog switch 15 and events. Note that a right event generated when the knob 31 of the jog switch 15 is flipped to the right will be explained below. Also, when the knob 31 is flipped to the left, a left event is generated.

As shown in FIG. 6, when the jog switch 15 is flipped to the right (left) side, a right (left) event is generated. When the jog switch 15 is kept flipped to the right (left) for a predetermined period of time (e.g., 1 sec), a right (left) continue event is generated.

On the other hand, when the user releases the jog switch 15 immediately after a right (left) event was generated, and the jog switch 15 returns to a neutral state, a return event is generated. Likewise, when the jog switch 15 returns to a neutral state after a right (left) continue event was generated, a return event is generated.

A disk drive 21 is provided to the right side surface of the computer main body 11. The disk drive 21 receives a disk medium 20 such as a CD-ROM or DVD-ROM that records audio data, a CD-ROM or DVD-ROM that records audio and video data, or the like as an object to be reproduced.

Figure 7:
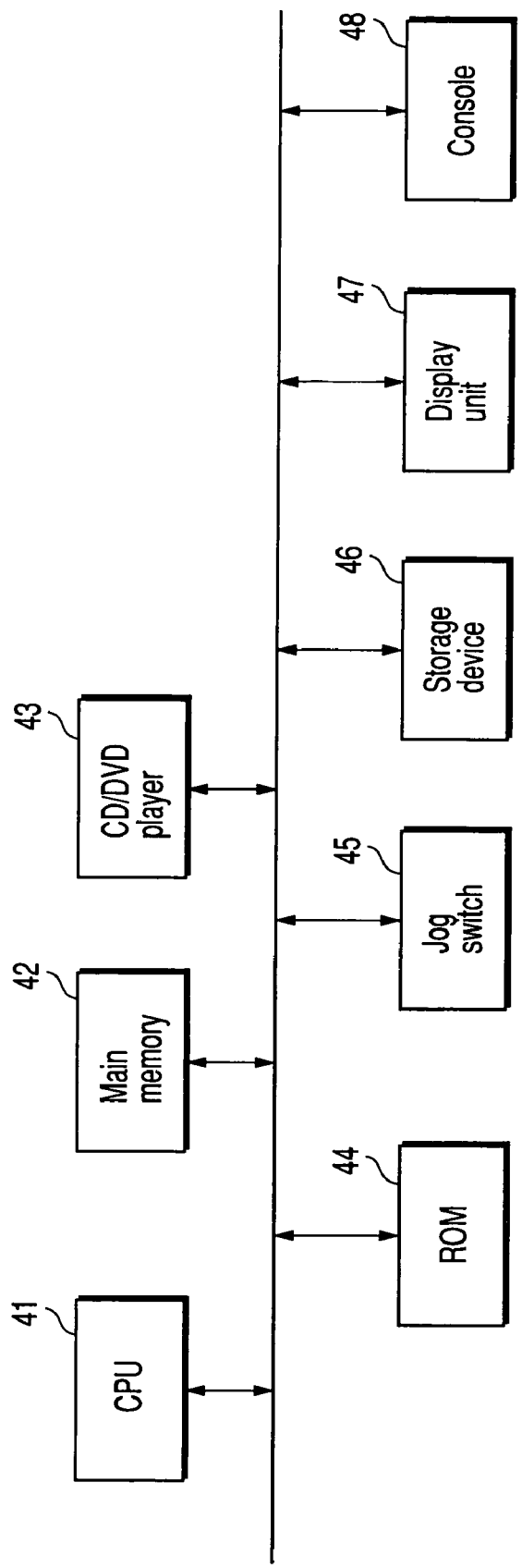
FIG. 7 is a schematic block diagram showing the arrangement of a notebook type personal computer according to an embodiment of the present invention.

FIG. 7 shows a schematic arrangement of the notebook type personal computer according to this embodiment.

Referring to FIG. 7, a CPU 41 controls the overall system, and executes programs stored in a main memory 42.

The main memory 42 stores a program for implementing processes of the flow charts to be explained later in this embodiment, a CD/DVD reproduce application program used to reproduce CD/DVD media, a digital audio application program used to reproduce digital audio data such as MP3 data, and the like.

A CD/DVD player 43 is used to reproduce CD/DVD media.

A ROM (Read Only Memory) 44 stores a BIOS (Basic Input Output System), and has a program for detecting events from a jog witch 45 and console 48.

The jog switch 45 generates different events depending on its flip direction and time, and also a return event when it returns to a neutral state, as shown in FIG. 6.

A storage device 46 is a memory card that stores digital audio data (for example, MP3 data). A display unit 47 is a display device such as a TFT, CRT, or the like.

The console 48 has the operation buttons 14 shown in FIG. 4, which include the buttons 14a to 14d.

The operation of the notebook type personal computer according to this embodiment will be described below. Note that the operation to be described below is implemented by the BIOS program stored in the ROM 44 and the program stored in the main memory 42. The relationship between the BIOS program stored in the ROM 44 and the program stored in the memory 42 will be described later.

1) When system is OFF

Figure 8:
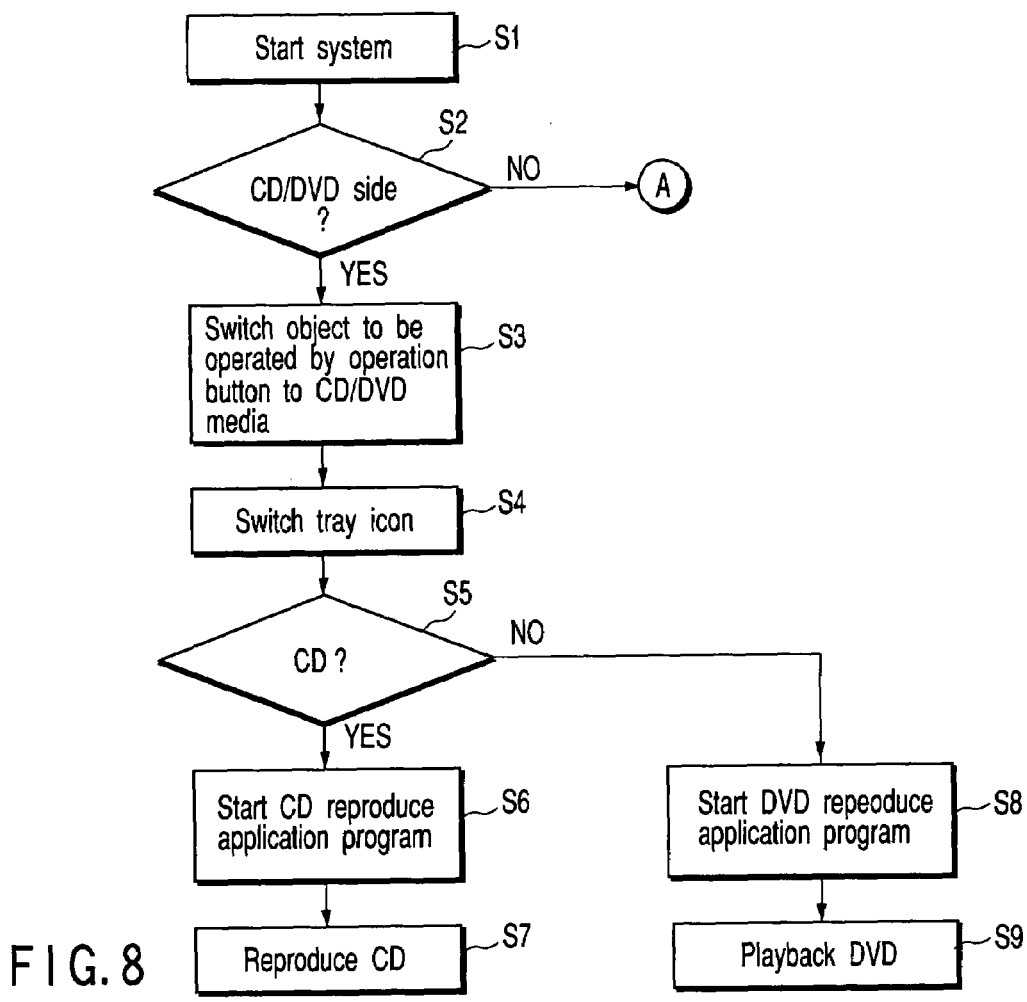
FIG. 8 is a flow chart for explaining the operation of the notebook type personal computer of the embodiment when the system is OFF.
Figure 9:
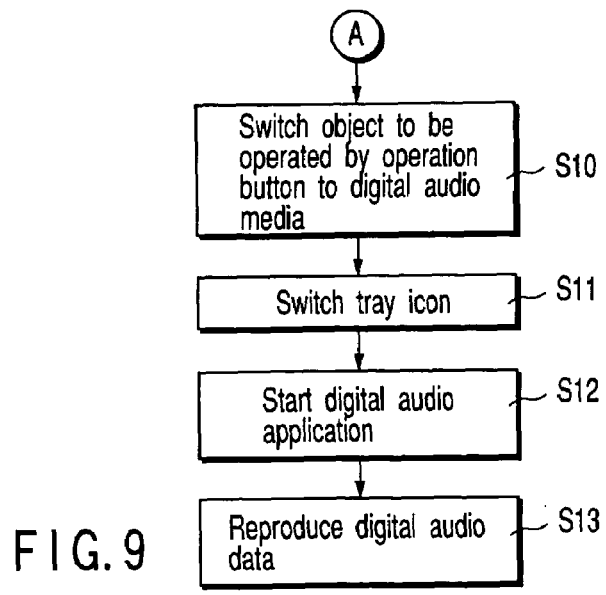
FIG. 9 is a flow chart for explaining the operation of the notebook type personal computer of the embodiment when the system is OFF.

The operation of the notebook type personal computer of this embodiment while the system is OFF will be explained below with reference to the flow charts of FIGS. 8 and 9.

While the system is OFF (hibernation or standby state), when the user flips the jog switch 15 to the CD/DVD side (A side in FIG. 4) or audio data side (B side in FIG. 4), the system is started (resumed) (S1), and it is checked if the jog switch 15 has been flipped to the CD/DVD side or audio data side (S2).

If it is determined in step S2 that the jog switch 15 has been flipped to the CD/DVD side, the object to be operated by the operation buttons 14 is switched to a CD/DVD medium (S3). And then, a tray icon is switched to that which can identify a CD/DVD mode, e.g., an icon 47 shown in FIG. 14 (S4), and it is then checked if a medium loaded in the CD/DVD player 43 is a CD (S5).

If it is determined in step S5 that the medium loaded in the CD/DVD player 43 is a CD, a CD reproduce application program is started (S6) to reproduce the CD (S7). If it is determined in step S5 that the medium loaded is not a CD, a DVD reproduce application program is started (S8) to reproduce a DVD (S9).

On the other hand, if it is determined in step S2 that the jog switch 15 has been flipped to the audio data side, the object to be operated by the operation buttons 14 is switched to a digital audio media (S10). And then, a tray icon is switched to that which can identify a digital audio mode, e.g., an icon 50 shown in FIG. 15 (S11), and the digital audio application program is started (S12) to reproduce digital audio data (S13).

In this manner, even when the system is OFF, CD/DVD media and digital audio data can be reproduced by flipping the jog switch.

2) When system is active

Figure 10:
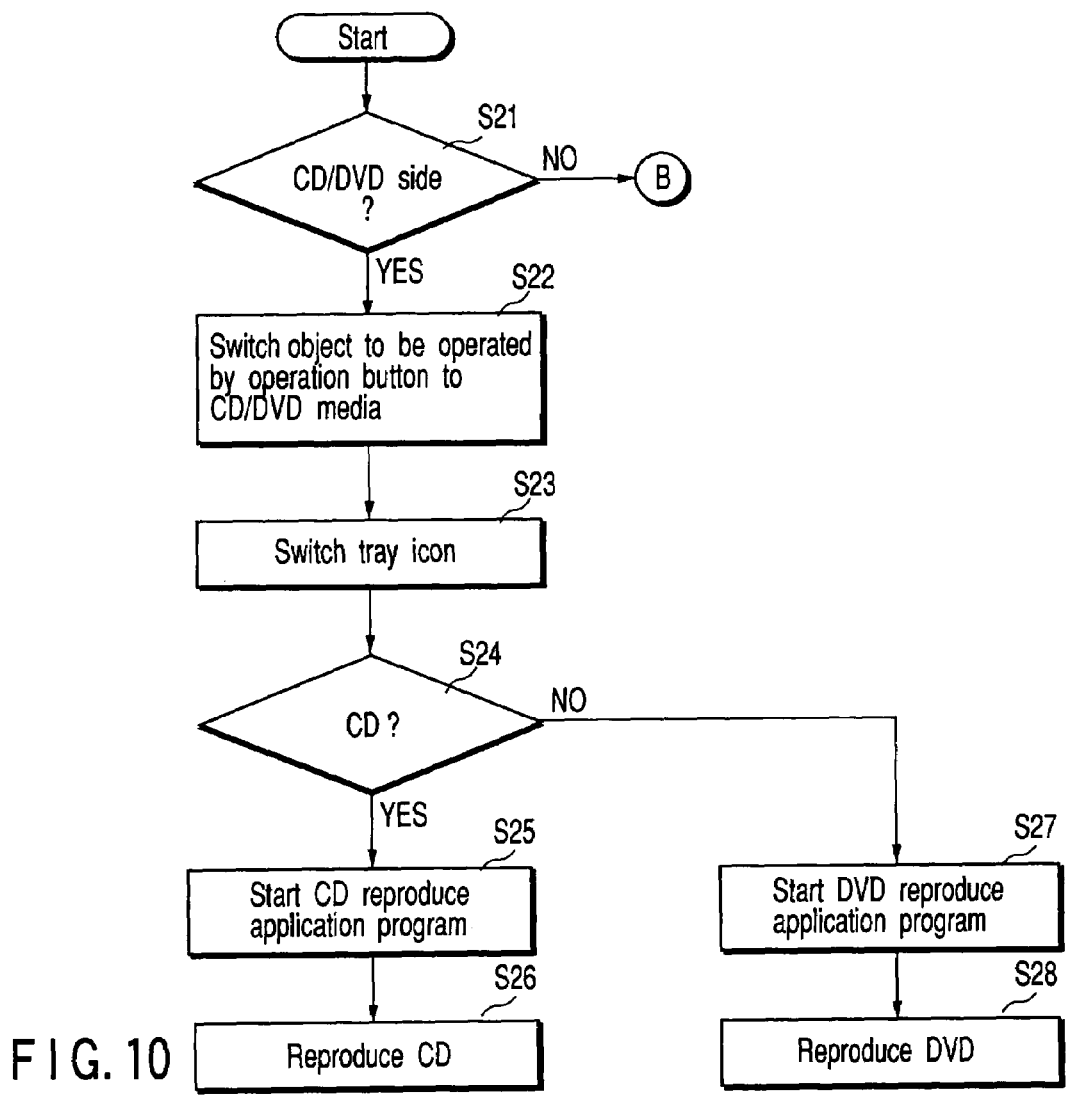
FIG. 10 is a flow chart for explaining the operation of the notebook type personal computer of the embodiment when the system is active.
Figure 11:
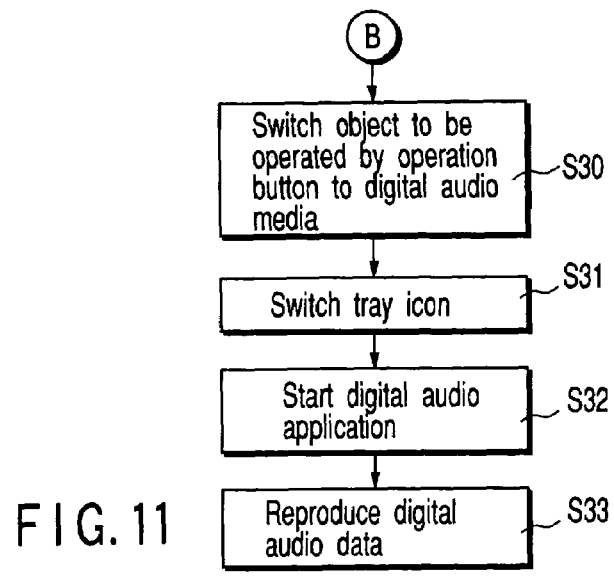
FIG. 11 is a flow chart for explaining the operation of the notebook type personal computer of the embodiment when the system is active.

The operation of the notebook type personal computer of this embodiment while the system is active will be explained below with reference to the flow charts of FIGS. 10 and 11.

When the user flips the jog switch 15 while the system is active, it is checked if the jog switch 15 has been flipped to the CD/DVD side or audio data side (S21).

If it is determined in step S21 that the jog switch 15 has been flipped to the CD/DVD side, the object to be operated by the operation buttons 14 is switched to a CD/DVD medium (S22). The tray icon is then switched to that which can identify the CD/DVD mode, e.g., the icon shown in FIG. 14 (S23), and it is then checked if a medium loaded in the CD/DVD player 43 is a CD (S24).

If it is determined in step S24 that the medium loaded in the CD/DVD player 43 is a CD, the CD reproduce application program is started (S25) to reproduce the CD (S26). If it is determined in step S24 that the medium loaded is not a CD, the DVD reproduce application program is started (S27) to reproduce a DVD (S28).

On the other hand, if it is determined in step S21 that the jog switch 15 has been flipped to the audio data side, the object to be operated by the operation buttons 14 is switched to a digital audio media (S30). And then, the tray icon is switched to that which can identify the digital audio mode, e.g., the icon shown in FIG. 15 (S31), and the digital audio application program is started (S32) to reproduce digital audio data (S33).

In this way, by only flipping the jog switch 15 while the system is active, CD/DVD media and digital audio data can be reproduced.

3) When player is running

The operation of the notebook type personal computer of this embodiment while the MP3 audio player or digital audio player reproduces the digital audio data will be explained below with reference to the flow charts of FIGS. 12 and 13.

In this case, a case will be explained below wherein the digital audio player reproduces digital audio data.

Figure 12:
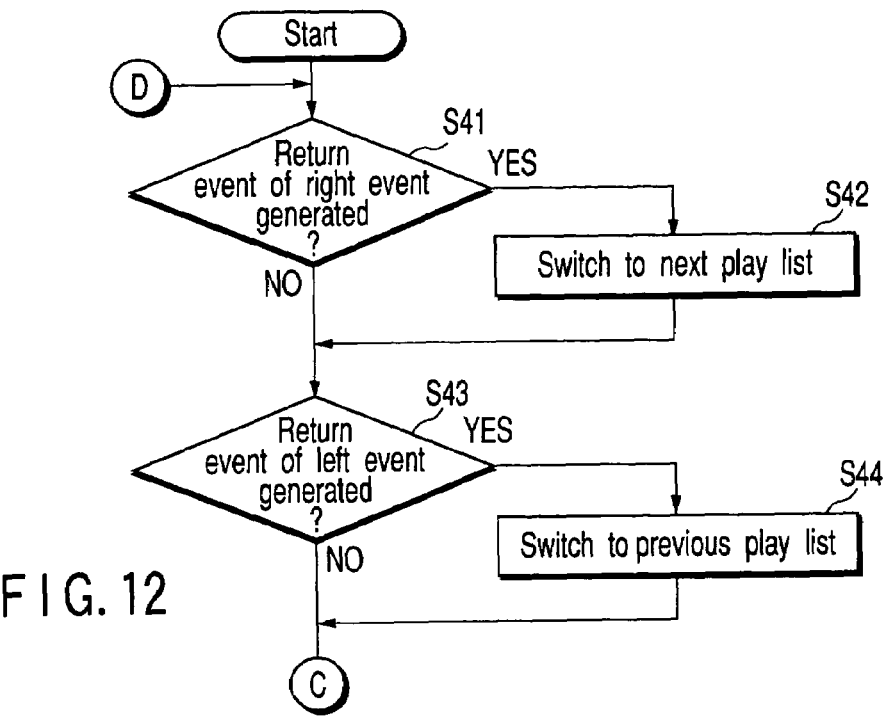
FIG. 12 is a flow chart for explaining the operation of the notebook type personal computer of the embodiment when a player is running.
Figure 13:
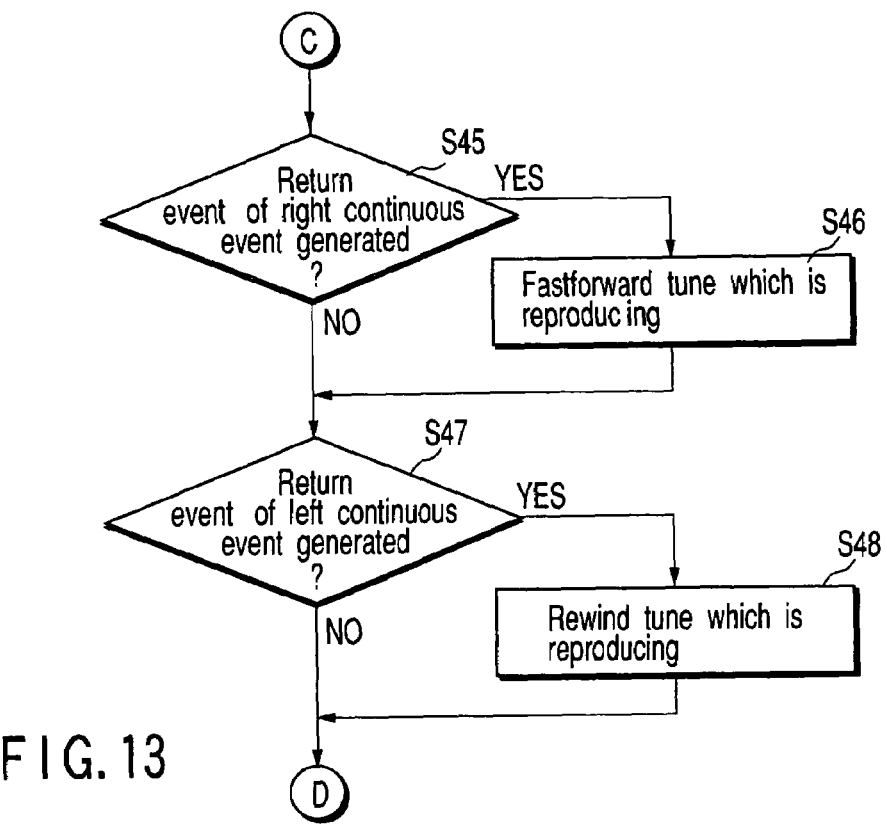
FIG. 13 is a flow chart for explaining the operation of the notebook type personal computer of the embodiment when the player is running.

As shown in FIG. 12, it is checked if the jog switch 15 has generated a return event of a right event (S41). Note that the return event of the right event generated by the jog switch 15 is an event generated when the jog switch 15 is flipped to the right to generate a right event and then returns to a neutral state. On the other hand, a return event of a right continue event is an event generated when the jog switch 15 is kept flipped to the right for a predetermined period of time to generate a right event and right continue event, and then returns to a neutral state.

Likewise, a return event of a left event is an event generated when the jog switch 15 is flipped to the left to generate a left event and then returns to a neutral state. On the other hand, a return event of a left continue event is an event generated when the jog switch 15 is kept flipped to the left for a predetermined period of time to generate a left event and left continue event, and then returns to a neutral state.

If it is determined in step S41 that a return event of a right event has been generated, a next play list is selected (S42), and the flow advances to step S43. On the other hand, if it is determined in step S41 that a return event of a right event has not been generated, the flow advances to step S43. Note that the play list means a list of a group of some tunes, and contains information of a reproducing order of tunes included in the play list. In this embodiment, assume that there are a plurality of play lists as groups of tunes.

It is then checked in step S43 if a return event of a left event has been generated. If it is determined in step S43 that a return event of a left event has been generated, a previous play list is selected (S44), and the flow advances to step S45.

On the other hand, if it is determined in step S43 that a return event of a left event has not been generated, the flow also advances to step S45.

Figure 19:
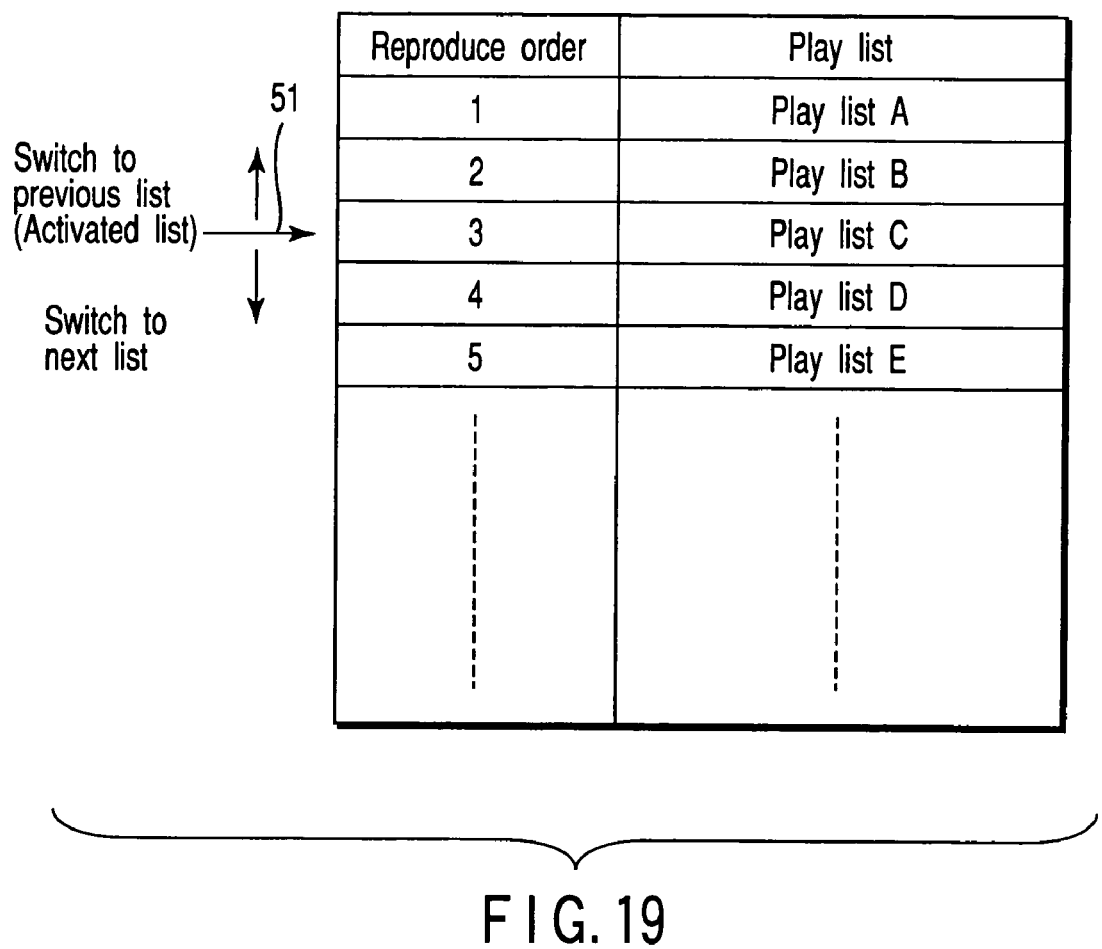
FIG. 19 is a diagram for explaining switching of play lists.

FIG. 19 is a diagram for explaining switching of play lists.

As shown in FIG. 19, a plurality of play lists are assigned to reproduce order. Pointer 51 indicates an activated list. In this case, the pointer 51 indicates a play list C assigned to reproduce order 3, thus the lay list C is activated.

If the return event of the right event is generated, the pointer 51 moves to a position indicating a play list B assigned to reproduce order 2. And then, the play list B is activated. Namely, if the return event of the right event is generated, the activated play list is switched to a previous play list.

If the return event of the left event is generated, the pointer 51 moves to a position indicating a play list D assigned to reproduce order 4. And then, the play list D is activated. Namely, if the return event of the left event is generated, the activated play list is switched to a next play list.

The plurality of play lists are stored a memory of the personal computer and the play lists can be inserted/added by a user.

It is checked in step S45 if a return event of a right continue event has been generated. If it is determined in step S45 that a return event of a right continue event has been generated, a tune which is reproducing is fastforwarded (S46), and the flow advances to step S47. On the other hand, if it is determined in step S45 that a return event of a right continue event has not been generated, the flow also advances to step S47.

It is checked in step S47 if a return event of a left continue event has been generated. If it is determined in step S47 that a return event of a left continue event has been generated, a tune which is reproducing is rewound (S48), and the flow returns to step S41. On the other hand, if it is determined in step S47 that a return event of a left continue event has not been generated, the flow also returns to step S41.

Therefore, according to the embodiment of the present invention, by assigning various functions to events generated by the jog switch 15, the play list can be switched and tunes can be selected without any complicated operations.

Note that the operations of the notebook type personal computer of this embodiment are not limited to those described above. For example, in the above description, when the jog switch 15 is instantaneously flipped while the player is running (to generate a return event of a right or left event), the play list is switched, or when the jog switch 15 is kept flipped for a predetermined period of time (to generate a return event of a right or left continue event), a tune which is reproducing is fastforwarded or rewound. However, the present invention is not limited to these specific operations.

For example, when the jog switch 15 is instantaneously flipped while the player is running (to generate a return event of a right or left event), a tune which is reproducing is underway may be fastforwarded or rewound, or when the jog switch 15 is kept flipped for a predetermined period of time (to generate a return event of a right or left continue event), the previous or next play list may be selected.

In the above description, reproduce of digital audio data has been exemplified. Also, various functions can be assigned to the jog switch 15 even in the CD/DVD mode.

For example, when the jog switch 15 generates a return event of a right event while a tune recorded on a CD medium is being reproduced, the tune which is reproducing may be switched to the next tune; when the jog switch 15 generates a return event of a left event, the tune which is reproducing may be switched to the previous tune; when the jog switch 15 generates a return event of a right continue event, the tune which is reproducing may be fastforwarded; and when the jog switch 15 generates a return event of a left continue event, the tune which is reproducing may be rewound.

That is, a characteristic feature of the present invention is to execute processes corresponding to various events generated by the jog switch 15, and various processes may be assigned as those corresponding to various events.

For example, upon switching the play list, a pointer 51 may be displayed on the display unit 47, and may move in cooperation with the operation of the jog switch, as shown in FIG. 16. In this case, when the jog switch 15 generates a return event of a right or left event, the pointer 51 is shifted downward or upward; when the jog switch 15 generates a return event of a right or left continue event, the pointer 51 is scrolled downward or upward.

Figure 17:
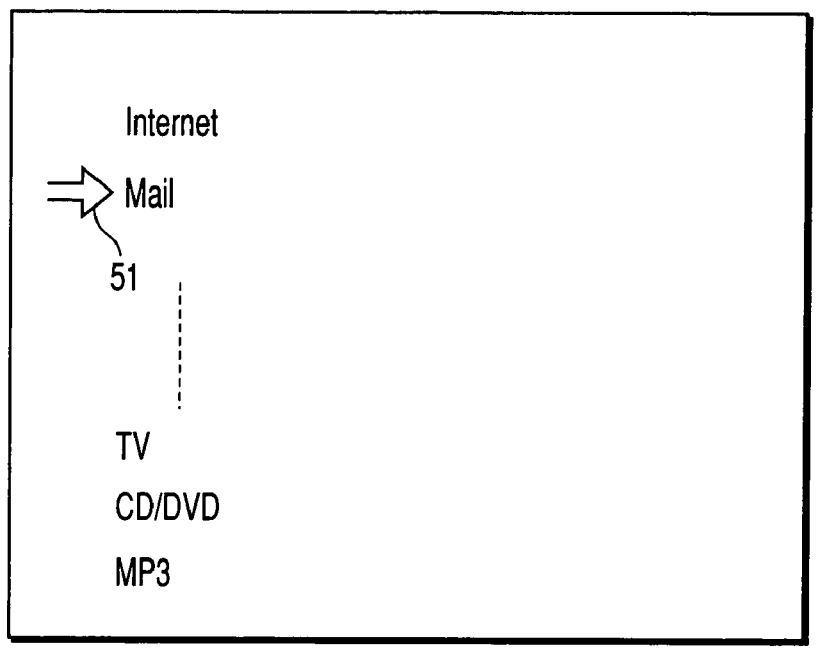
FIG. 17 shows a display screen used to select an object to be started by the system.

Upon starting up the system, a screen shown in FIG. 17 and the pointer 51 may be displayed on the display unit 47, and the pointer 51 may be moved in accordance with the operation of the jog switch 15 to select an arbitrary process. In this case as well, when the jog switch 15 generates a return event of a right or left event, the pointer 51 is shifted downward or upward; when the jog switch 15 generates a return event of a right or left continue event, the pointer 51 is scrolled downward or upward.

Figure 18:
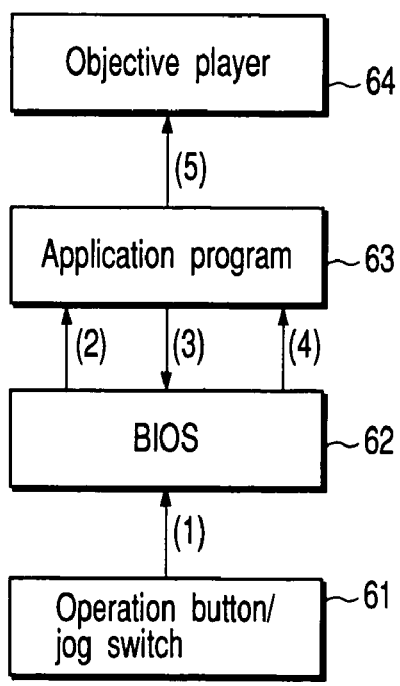
FIG. 18 is a diagram for explaining an informing method of the operation button and jog switch.

An informing method of depression of the operation buttons 14 and events from the jog switch 15 will be explained below with reference to FIG. 18.

When the user has pressed one of the operation buttons 14 or has flipped the jog switch 15, an operation button/jog switch 61 informs a BIOS 62 of a corresponding event.

The BIOS 62 informs an application program 63 of the event generated upon pressing one of the operation buttons 14 or flipping the jog switch 15. Upon receiving an event generation message from the BIOS 62, the application program 63 inquires the type of event of the BIOS 62.

Upon receiving the event type inquiry from the application program 63, the BIOS 62 informs the application program 63 of the type of event. Upon receiving an event type message from the BIOS 62, the application program 63 generates an application command message corresponding to the received event, and executes a predetermined process such as operation of an objective player 64 by the generated application command message.

That is, an event generated by one of the operation buttons 14 or jog switch 15 is recognized by the BIOS 62, and the application program 63 executes various processes on the basis of the type of recognized event.

Therefore, according to the notebook type personal computer of this embodiment, by operating the jog switch, various processes such as reproduce of CD/DVD data recorded on CD/DVD media, switching of the play list in digital audio data, switching of tunes, and the like can be easily executed.

<Another Embodiment>

A portable information device according to another embodiment will be described.

In the above embodiment, a change of audio data, fastforward, rewind, and change of play lists are performed according to the types of events generated from the jog switch, but it is not limited to this.

Namely, according to present invention, it is possible that various processes are performed in accordance with the types of the events.

In addition, the events generated from the jog switch is not limited to the events described in the above embodiment. For example, it may occur different events depending on hour during the jog switch is flipped.

In the above embodiment, when the jog switch is flipped during the predetermined time, the continuous event is generated. However, it may occur same event periodically.

With this structure that, when the jog switch is flipped during the predetermined time, the same event is generated periodically, for example, it can be applied to turn over a page of word processor, a movement of screen displayed on a browser, etc.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A computer system comprising:
   a switch for generating different events in correspondence with flip direction and flip times; and
   means for executing a process corresponding to a type of event generated by said switch,
   wherein the switch generates a first event upon being flipped in one direction, a second event upon being flipped in the other direction, and a return event upon returning from a flipped state to a neutral state, the executing means executes a process corresponding to the first event when the return event is generated after the first event and executes a process corresponding to the second event when the return event is generated after the second event, and
   wherein the switch generates a first continue event when the switch is flipped in the one direction during a predetermined time period and generates a second continue event when the switch is flipped in the other direction during the predetermine time period, the executing means executes a process corresponding to the first continue event when the return event is generated after the first continue event and executes a process corresponding to the second continue event when the return event is generated after the second continue event.

2. A computer system comprising:
   a switch for generating different events in correspondence with flip direction and flip times; and
   means for executing a process corresponding to a type of event generated by said switch,
   wherein the switch generates a first event upon being flipped in one direction, a second event upon being flipped in the other direction, and a return event upon returning from a flipped state to a neutral state, the executing means executes a process corresponding to the first event when the return event is generated after the first event and executes a process corresponding to the second event when the return event is generated after the second event, and
   wherein the switch periodically generates the first event when the switch is flipped in the one direction during a predetermined time period and periodically generates second event when the switch is flipped in the other direction during a predetermined time period.

3. A method of executing a process in a computer system comprising:

detecting flip directions and flip times of a switch; generating an event corresponding to the detected flip directions and times of the switch; and executing a process corresponding to a type of the event generated by the switch, wherein the switch generates a first event upon being flipped in one direction, a second event upon being flipped in the other direction, and a return event upon returning from a flipped state to a neutral state, the executing step executes a process corresponding to the first event when the return event is generated after the first event and executes a process corresponding to the second event when the return event is generated after the second event, and wherein the switch generates a first continue event when the switch is flipped in the one direction during a predetermined time period and generates a second continue event when the switch is flipped in the other direction during the predetermine time period, the executing means executes a process corresponding to the first continue event when the first continue event is generated and executes a process corresponding to the second continue event when the second continue event is generated.

4. A method of executing a process in a computer system comprising:

detecting flip directions and flip times of a switch; generating an event corresponding to the detected flip directions and times of the switch; and executing a process corresponding to a type of the event generated by the switch, wherein the switch generates a first event upon being flipped in one direction, a second event upon being flipped in the other direction, and a return event upon returning from a flipped state to a neutral state, the executing step executes a process corresponding to the first event when the return event is generated after the first event and executes a process corresponding to the second event when the return event is generated after the second event, and wherein the switch periodically generates the first event when the switch is flipped in the one direction during a predetermined time period and periodically generates second event when the switch is flipped in the other direction during a predetermined time period.

5. A computer system comprising:

first reproducing device reproducing first content data;

second reproducing device reproducing second content data;

a switch for generating a first event upon being flipped in one direction, generating a second event upon being flipped in the other direction, and generating a return event upon returning from a flipped state to a neutral state;

control means for, when said first and second reproducing devices do not reproduce any data, and said switch generates the return event after the first event is generated, controlling said first reproducing device to reproduce the first content data, and for, when said switch generates the return event after the second event is generated, controlling said second reproducing device to reproduce the second content data; and a device configured to store a plurality of play lists respectively assigned to reproducing sequence numbers, wherein if said switch generates the return event after the first event is generated, a play list which is reproducing, is switched to a next play list having a reproducing sequence number following to the reproducing number of the play list which is reproducing, and if said switch generates the return event after the second event is generated, the play list which is reproducing, is switched to a previous play list having a reproducing sequence number antecedent to the reproducing number of the play list which is reproducing.

6. A computer system comprising:

first reproducing device reproducing first content data;

second reproducing device reproducing second content data;

a switch for generating a first event upon being flipped in one direction, generating a second event upon being flipped in the other direction, and generating a return event upon returning from a flipped state to a neutral state; and control means for, when said first and second reproducing devices do not reproduce any data, and said switch generates the return event after the first event is generated, controlling said first reproducing device to reproduce the first content data, and for, when said switch generates the return event after the second event is generated, controlling said second reproducing device to reproduce the second content data, wherein said switch generates a third event after an elapse of a predetermined period of time while said switch is kept flipped in the one direction, and generates a fourth event after an elapse of a predetermined period of time while said switch is kept flipped in the other direction, and if the return event is generated after the third event is generated, said control means fastforwards a content which is reproducing, and if the return event is generated after the fourth event is generated, said control means rewinds the content which is reproducing.

7. A computer system comprising:

first reproducing device reproducing first content data;

second reproducing device reproducing second content data;

a switch for generating a first event upon being flipped in one direction, generating a second event upon being flipped in the other direction, and generating a return event upon returning from a flipped state to a neutral state;

control means for, when said first and second reproducing devices do not reproduce any data, and said switch generates the return event after the first event is generated, controlling said first reproducing device to reproduce the first content data, and for, when said switch generates the return event after the second event is generated, controlling said second reproducing device to reproduce the second content data; and a device configured to store a play list for storing reproducing sequence of contents, wherein if said switch generates the return event after the first event is generated, a content which is reproducing, is switched to a next content based on the play list, and if said switch generates the return event after second event is generated, the content which is reproducing, is switched to a previous content based on the play list.

8. A computer system comprising:

first reproducing device reproducing first content data;

second reproducing device reproducing second content data;

a switch for generating a first event upon being flipped in one direction, generating a second event upon being flipped in the other direction, and generating a return event upon returning from a flipped state to a neutral state;

control means for, when said first and second reproducing devices do not reproduce any data, and said switch generates the return event after the first event is generated, controlling said first reproducing device to reproduce the first content data, and for, when said switch generates the return event after the second event is generated, controlling said second reproducing device to reproduce the second content data; and a device configured to store a plurality of play lists respectively assigned to reproducing sequence numbers, wherein said switch generates a third event after an elapse of a predetermined period of time while said switch is kept flipped in the one direction, and generates a fourth direction after an elapse of a predetermined period of time while said switch is kept flipped in the other direction, and if the return event is generated after the third event is generated, said control means switches a play list which is reproducing, to a next play list having a reproducing sequence number following to the reproducing number of the play list which is reproducing, and if the return event is generated after the fourth event is generated, said control means switches the play list which is reproducing to a previous play list having a reproducing sequence number antecedent to the reproducing number of the play list which is reproducing.

9. A data reproducing method in a computer system, comprising:

detecting an event from a switch which generates a first event upon being flipped in one direction, generates a second event upon being flipped in the other direction, and generates a return event upon returning from a flipped state to a neutral state;

reproducing first content data when the return event is generated after the first event is generated, and reproducing second content data when the return event is generated after the second event is generated; and a device configured to store a plurality of play lists respectively assigned to reproducing sequence numbers, wherein the method comprises:

determining whether said switch generates the return event after the first event is generated or said switch generates the return event after the second event is generated; and if said switch generates the return event after the first event is generated, a play list which is reproducing, is switched to a next play list having a reproducing sequence number following to the reproducing number of the play list which is reproducing, and if said switch generates the return event after the second event is generated, the play list which is reproducing, is switched to a previous play list having a reproducing sequence number antecedent to the reproducing number of the play list which is reproducing.

10. A data reproducing method in a computer system, comprising:

detecting an event from a switch which generates a first event upon being flipped in one direction, generates a second event upon being flipped in the other direction, and generates a return event upon returning from a flipped state to a neutral state; and reproducing first content data when the return event is generated after the first event is generated, and reproducing second content data when the return event is generated after the second event is generated, wherein said switch generates a third event after an elapse of a predetermined period of time while said switch is kept flipped in the one direction, and generates a fourth event after an elapse of a predetermined period of time while said switch is kept flipped in the other direction, and the method comprises:

determining whether the return event is generated after the third event is generated or the return event is generated after the fourth event is generated; and if the return event is generated after the third event is generated, said control means fastforwards a content which is reproducing, and if the return event is generated after the fourth event is generated, said control means rewinds the content which is reproducing.

* * * * *